United States Patent [19]
Couwenhoven et al.

[11] Patent Number: 5,596,602
[45] Date of Patent: Jan. 21, 1997

[54] DATA COMPRESSION RATE CONTROL METHOD AND APPARATUS

[75] Inventors: Douglas W. Couwenhoven, Fairport; Bhavan R. Gandhi, Pittsford, both of N.Y.; Craig M. Smith, Setagaya-ku, Japan

[73] Assignee: Eastman Kodak Company, Rochester, N.Y.

[21] Appl. No.: 409,571

[22] Filed: Mar. 24, 1995

[51] Int. Cl.⁶ ............................. H04B 1/66; H04B 14/06
[52] U.S. Cl. .......................... 375/240; 375/245; 375/377
[58] Field of Search ...................... 375/340, 341, 375/242, 244, 245, 295, 377; 348/384, 409; 341/143; 381/29

[56] References Cited

U.S. PATENT DOCUMENTS

| | | | |
|---|---|---|---|
| 4,093,962 | 6/1978 | Ishiguro et al. | 358/138 |
| 4,255,763 | 3/1981 | Maxemchuk et al. | 358/135 |
| 4,821,290 | 4/1989 | Hingorani et al. | 375/245 |
| 4,897,855 | 1/1990 | Acampora | 375/244 |
| 5,506,686 | 4/1996 | Auyeung et al. | 348/409 |

*Primary Examiner*—Tesfaldet Bocure
*Attorney, Agent, or Firm*—Thomas H. Close

[57] ABSTRACT

A data compression system can operate in a number of different configurations, and wherein the bit rate produced by a given configuration can be controlled over some finite range by a control signal from a rate controller for smoothly transitioning between the configurations so that discontinuous jumps in bit rate and distortion are minimized is provided by determining thresholds on the feedback control signals, the thresholds being used to determine when to switch in or out of each configuration; the thresholds furthermore being determined from the intersection points of the rate distortion curves for the available configurations.

5 Claims, 5 Drawing Sheets

DATA COMPRESSION RATE CONTROL METHOD AND APPARATUS

This invention was made with Government support under contract number FA7056-92-C-0020 awarded by the Department of Defense. The Government has certain rights in this invention.

The disclosure in the appendix contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The present invention relates to digital information processing and more particularly to data compression. Specifically, the invention deals with controlling to a fixed rate the output of a variable rate data compression module that is capable of operating in a number of different configurations, where the bit rate for each configuration may be controlled over some finite range by a control signal supplied by a rate controller.

BACKGROUND OF THE INVENTION

Data compression techniques are useful for reducing the number of bits that must be stored or transmitted when archiving or transmitting a digital data stream. If the number of bits per source symbol generated by the compression technique is a constant, then the technique is said to be fixed rate. Conversely, if the number of bits per source symbol generated varies throughout the compression, then the technique is said to be variable rate. Generally, variable rate techniques will employ a variable length entropy coding scheme such as Huffman coding to encode the source symbols, resulting in lower distortion of the data when compared to a fixed rate technique at the same rate. Therefore, from an overall performance standpoint, it is generally advantageous to use a variable rate data compression scheme. However, in many applications the transmission channel is a fixed rate link, which means that a method of coupling the output of the variable rate data compression module into the fixed rate channel is required.

The concept of controlling the output rate of a variable rate data compression technique that operates in a single configuration is well known in the prior art, as is noted in U.S. Pat. No. 4,093,962 issued Jun. 6, 1978 to Ishiguro, et al. A configuration is defined as a single set of operating parameters under which a compression technique functions. As shown in FIG. 1, a compression module 10 receives digital data from a source 12 and outputs digital data at a variable rate. A rate buffer 14 includes a memory which is filled at a variable rate by the output data from the compression module and emptied at a fixed rate by a transmission channel 16. The transmission channel then transmits the compressed data to a receiver where it is processed by a decompression module 18. The fill conditions of the rate buffer are monitored by a rate controller 20, which feeds a control signal S on line 22 back to the compression module, modifying its output bit rate. If the average output bit rate from the compression module is greater than the channel transmission rate, then the buffer will begin to fill with the excess data. The rate controller senses this, and modifies the control signal S so that the compression module reduces the average output bit rate. If the average output bit rate from the compression module is less than the channel transmission rate, then the rate controller modifies the control signal S so that the compression module increases the average output bit rate.

For a given source, the overall performance of the compression technique can be characterized by a rate distortion curve 24, as shown in FIG. 2. In this figure, the output bit rate of the compression module is plotted on the horizontal axis, and the distortion introduced by the compression process is plotted on the vertical axis. The distortion may be calculated via a number of different metrics that compare the overall difference between the digital data entering the compression module 12 to the digital data after it has undergone the subsequent decompression 18. One such distortion metric is the root mean squared error (RMSE). It should be noted that the rate distortion curve shown in FIG. 2 is an average curve that best approximates the cloud of points that characterize the performance of a compression technique. For a rate controlled compression technique, the value of the control signal S is correlated with the bit rate and signal distortion that the compression technique delivers, and hence defines the point on the rate distortion curve where the compression technique will perform. Hence, the value of the control signal S parameterizes the rate distortion function for the compression technique. As the data from the source is being processed by the compression module, the performance point will change position, and slide roughly along the rate distortion curve as the statistics of the input data vary. The task of the rate controller is to smooth out the variations, and keep the performance point as close to the transmission rate $R_T$ indicated by dashed line 26 in FIG. 2, as possible.

If a certain compression technique is applied to data from different sources and the sources have statistically different properties, then the compression technique will generally exhibit a different rate distortion curve for each source, as shown in FIG. 3. Rate controlling the compression technique so that the output bit rate hovers near the transmission rate $R_T$ as shown by dashed line 28 in FIG. 3, is well known in the prior art.

However, more advanced compression techniques will often contain several distinct operating configurations, each of which is designed to achieve a certain average bit rate or distortion level. Thus, a given source, each configuration of a more advanced compression technique will have a different rate distortion curve, as shown in FIG. 4. Generally, the rate distortion curves for the different configurations will overlap, allowing the compression technique to operate over a wide range of bit rates by switching between the available configurations. As before, when the more advanced compression technique is applied to statistically different sources, the result is different sets of rate distortion curves as shown in FIG. 5. In FIG. 5, the set of rate distortion curves for a first source (source 1) are represented by the thick lines, and the set for the second source (source 2) are represented by thin lines.

The task of the rate controller in a more advanced compression technique with multiple configurations now becomes more complex, as the rate controller must determine when it is appropriate to switch between the available configurations as well as modulate the bit rate within a given configuration. Such a rate control method is described in U.S. Pat. No. 4,897,855 issued Jan. 30, 1990 to Acampora. This patent describes a rate controlled DPCM compression scheme that adaptively changes the quantizer (i.e., changes configuration), as indicated by the signal C in FIG. 1, based on the fill percent and fill rate of the rate buffer. Each quantizer can be considered to be a different configuration of the compression scheme. Thus, the compression scheme has multiple configurations, each of which will produce a different rate distortion curve, as shown in FIG. 4. Switching between these configurations based on the fill conditions of the buffer is effective at controlling the rate, but is not optimal from a rate distortion standpoint due to the fact that different sources will produce different sets of rate distortion curves, as shown in FIG. 5. For example, in FIG. 5, a correct change from configuration 0 to configuration 1 will be made for source 2 if the bit rate increases to $R_0$, but the same configuration change at $R_0$ will be incorrect for source 1, resulting in a discontinuous jump in output signal quality and bit rate. This is disadvantageous, as discontinuous jumps in the bit rate will make the process more difficult to control, and discontinuous jumps in the reconstructed signal quality are undesirable. The optimal time to switch from configuration 0 to configuration 1 for source 1 would be when the bit rate reaches $R_1$. Therefore, changing configurations based on the bit rate (buffer fill conditions) solely will not accomplish this optimal transition, because the transition points $R_0$ and $R_1$ will change location depending on the source. This problem has not been recognized or addressed in the prior art.

SUMMARY OF THE INVENTION

The above noted problem is solved according to the present invention by providing a data compression system that can operate in a number of different configurations, and wherein the bit rate produced by a given configuration can be controlled over some finite range by a control signal from a rate controller for smoothly transitioning between the configurations so that discontinuous jumps in bit rate and distortion are minimized. This is accomplished by determining thresholds on the feedback control signals, the thresholds being used to determine when to switch in or out of each configuration; the thresholds furthermore being determined from the intersection points of the rate distortion curves for the available configurations. This is an improvement over the prior art because the intersection points of the rate distortion curves for the different configurations will change location based on the statistics of the source signal, but the value of the feedback control signals that corresponds to the intersection location(s) remains relatively constant regardless of the statistics of the source signal. Thus, switching configurations based on the value of the feedback control signals assures that there are no undesirable jumps in bit rate or distortion of the reconstructed signal.

The major advantages of this are twofold: first, since the output bit rate of the compression technique now varies smoothly across the mode transition boundary, then the controllability of the compression technique is increased. Secondly, the distortion level also varies smoothly across the mode transition boundary, so the configuration transition is not perceived as a discontinuous jump in the quality of the reconstructed signal. This provides a significant advantage when the source is image data, as the human observer will not detect the configuration transition as a quality change in the reconstructed image.

Since the invention switches between configurations based on the value of the control signal and not the buffer fill conditions, then a special contingency configuration is needed to guarantee against buffer overflow. This contingency configuration is triggered directly from the buffer fill conditions, and supersedes the configuration selection of the rate controller in the event of an imminent buffer overflow or underflow.

Table 1 shows a table of minimum and maximum thresholds on the control signal for each mode. These thresholds are used to determine when the compression module needs to change configurations.

Table 2 shows a table of multipliers that are used to keep the performance point at the same location in rate distortion space when making a configuration change. This table is populated by data that is determined from the intersection points of the rate distortion curves for the individual configurations.

DETAILED DESCRIPTION OF THE INVENTION

Figure 1:
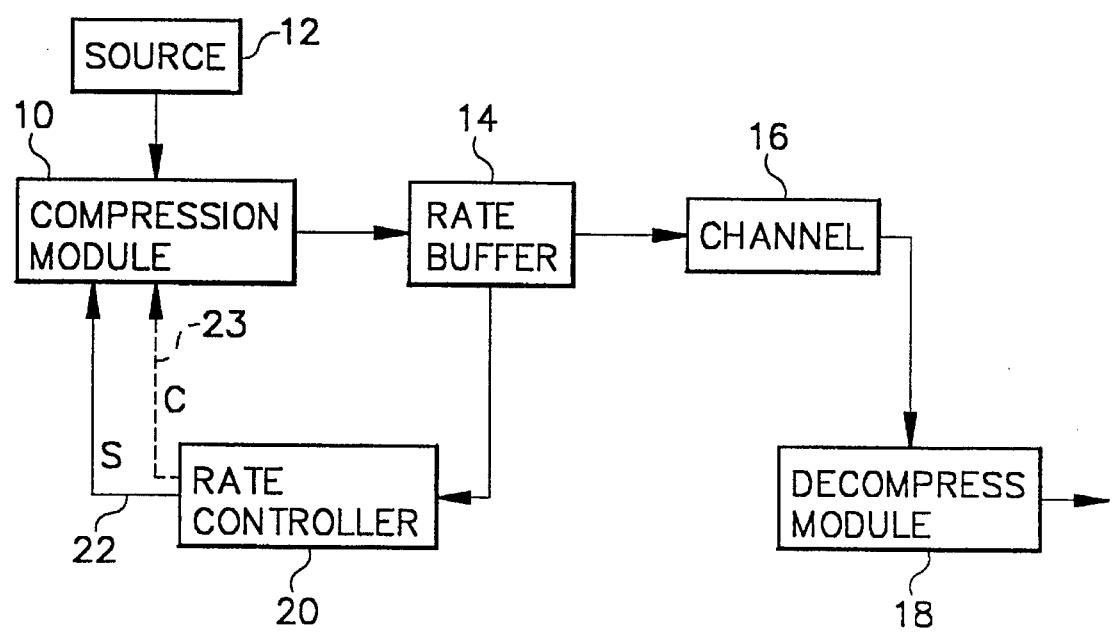
FIG. 1 is a block diagram showing a variable rate compression technique, including a rate buffer and rate controller.
Figure 2:
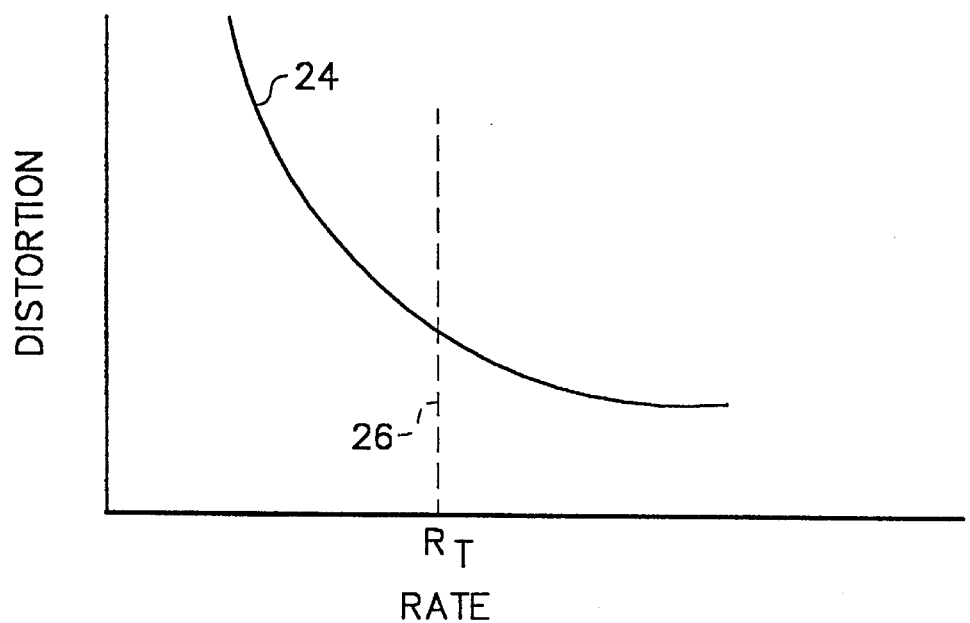
FIG. 2 is a graph showing a rate distortion curve for a compression technique that operates in a single mode.
Figure 3:
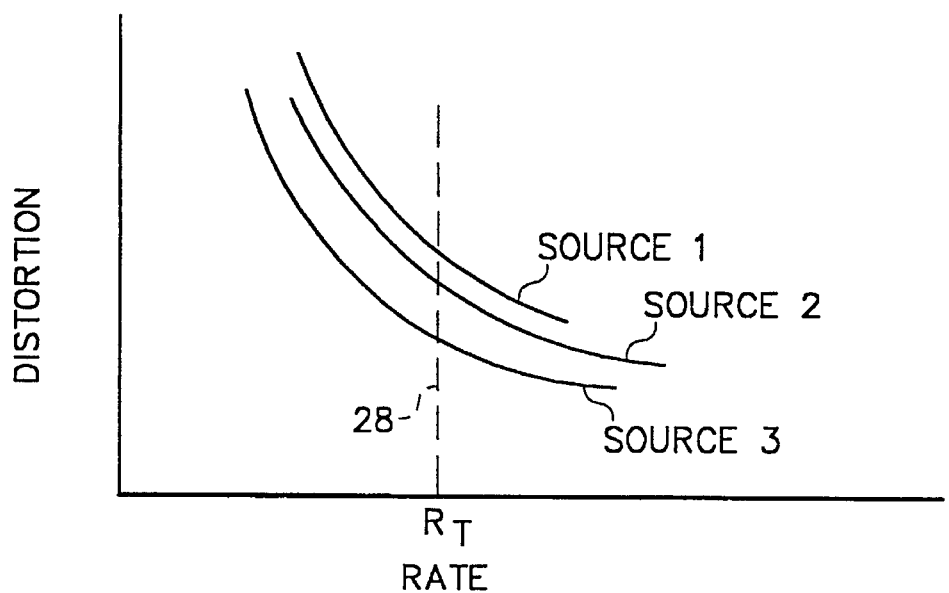
FIG. 3 is a graph showing rate distortion performance curves for a typical variable rate compression technique that is applied to statistically different sources.

Referring again to FIG. 1, an apparatus for controlling the rate of a variable rate compression technique according to the present invention will be described. The compression module 10 receives digital data from a source 12 and outputs digital data at a variable rate into a rate buffer 14. A channel 16 empties the rate buffer at a fixed rate for transmission. A rate controller 20 monitors the fill conditions of the rate buffer 14 and creates a control signal S, on line 22 and a configuration select signal C, on line 23 which are fed back to the compression module 10. The compression module 10 is responsive to the signals generated by the rate controller 20, to change its compression rate. The rate controller 20 controls the rate of the compression module 10 to match the channel transmission rate of channel 16.

Figure 4:
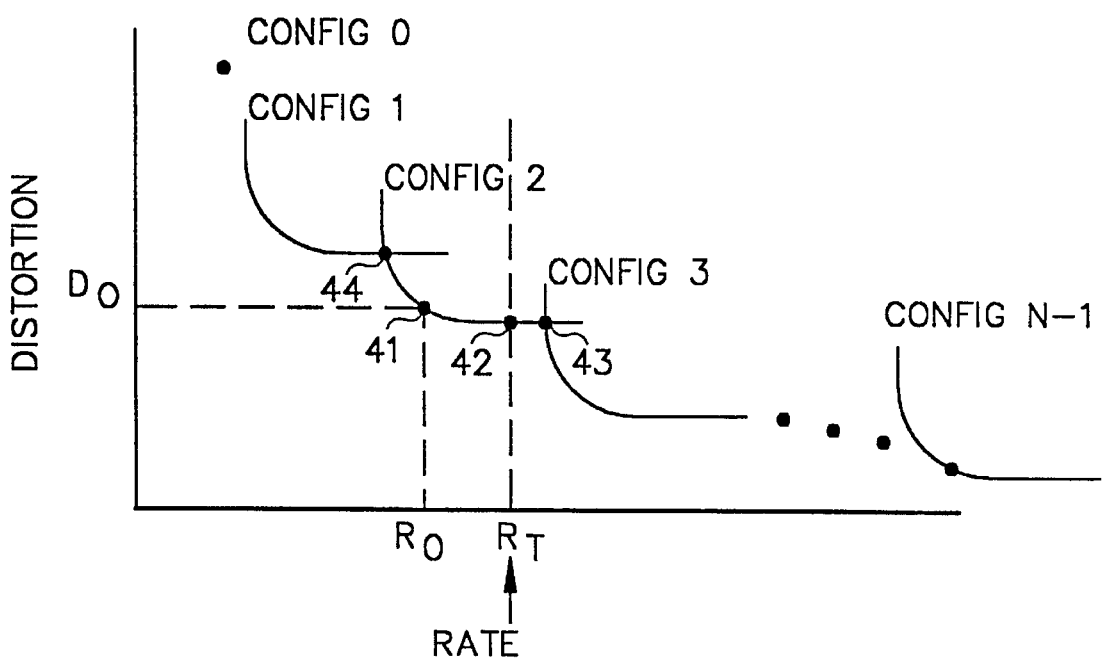
FIG. 4 is a graph showing rate distortion performance curves for a more complex compression technique that can operate in several distinct configurations.
Figure 5:
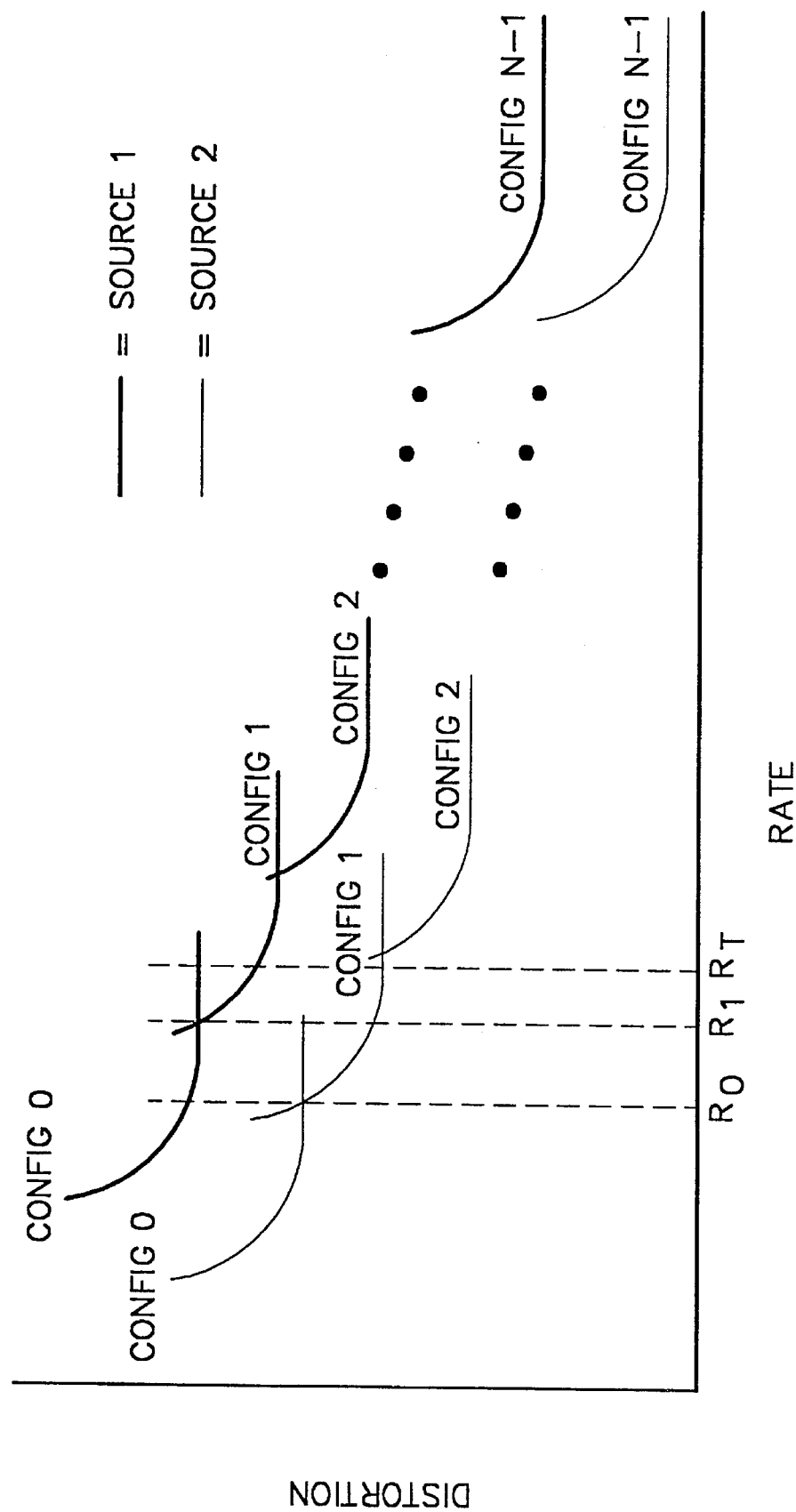
FIG. 5 is a graph showing rate distortion curves for an advanced compression technique with multiple configurations that is applied to statistically different sources.

The compression module 10 possesses N discrete operating configurations, each of which possesses a unique rate distortion curve, as shown in FIG. 4. The configurations are numbered from 1, which is the minimum rate/maximum distortion configuration, to N−1, which is the maximum rate/minimum distortion configuration. Configuration 0 is reserved to indicate a special danger configuration, which is selected based solely on the buffer fill fraction, and is only used when the buffer is in imminent danger of overflowing. The danger configuration is designed so that the maximum bit rate generated by the compression module will not exceed the transmission rate of channel 16, thereby preventing the rate buffer from overflowing.

When operating in a given configuration, the performance of the compression module is characterized by a point on the rate distortion curve for the configuration. For example, consider a compression algorithm operating in configuration 2 and compressing data with an output rate of $R_0$ and reconstructed signal distortion $D_0$, both of which may be measured directly by the rate controller and/or compression module, or estimated from the buffer fill conditions. This performance is indicated by point 41 in FIG. 4. As the compression module processes data from the source 12, and as the statistics of the source change, the positions of the rate distortion curves shift with respect to the axes of the diagram (and the transmission rate, $R_T$). As the statistics of the source signal fluctuate, the positions of the individual rate distortion curves remain relatively constant with respect to each other. As noted earlier, this phenomenon is not discussed in the prior art, and none of the prior art algorithms for rate control employ knowledge of this phenomenon to control compression rate of a compression module.

The shifting of the rate distortion curves in turn causes the performance point 41 to fluctuate and deviate from the desired transmission rate $R_T$. The rate controller adaptively changes the value of the control signal S in response to the rate buffer fill conditions according to a governing equation called the rate control law, which tends to pull the performance point 41 from its current position towards the desired position 42 defined by the channel transmission rate. Note that for the purpose of describing the present invention, the particular compression scheme utilized in the compression module 10 is not material—it is required only that the compression module 10 possess multiple configurations, and that the output bit rate within each configuration is controllable over some finite range by a control signal from the rate controller 20.

To achieve the optimal rate distortion performance, it is desirable to minimize both the output bit rate and reconstructed signal distortion. By examining FIG. 4, we can see that this is achieved by selecting the configuration that delivers the lowest distortion at the current output bit rate. To this end, it is desirable to change the operating configuration of the compression module when the rate distortion performance point reaches an intersection point 43 (or 44) of the current rate distortion curve and the rate distortion curve for the next higher (or lower) configuration. As discussed earlier, this is accomplished in the prior art by switching the configuration based on the buffer fill conditions, which is not optimal for sources with different statistical properties. As noted above, the intersection points of the rate distortion curves for the different configurations will change position in rate distortion space when compressing data from sources that have different statistical properties, but the position of the intersection points of the rate distortion curves do not change place with respect to the value of the control signal. Thus, according to the present invention, the control signal itself is used as a indicator of when to change configurations, rather than the buffer fill conditions.

This is accomplished by determining a minimum and a maximum value of the control signal for each configuration from the intersection points of the rate distortion curves, which may be determined experimentally or theoretically. The threshold values are then stored in a table as shown in Table 1:

TABLE 1

| Configuration | 0 | 1 | ... | N-1 |
|---|---|---|---|---|
| SMIN | $SMIN_0$ | $SMIN_1$ | ... | $SMIN_{N-1}$ |
| SMAX | $SMAX_0$ | $SMAX_1$ | ... | $SMAX_{N-1}$ |

If the value of the control signal becomes less than the minimum value or greater than the maximum value, then the rate controller changes the configuration appropriately by changing the value of the configuration select signal C to correspond to the new configuration. Coincident with the configuration change, the rate controller changes the value of the control signals so that the performance point of the compression technique remains at the intersection point of the rate distortion curves of the old and new configurations after the configuration change. This is performed by multiplying the current value of the control signal by a value $g(i,j)$, shown in Table 2:

TABLE 2

| | NEW CONFIGURATION # | | | | |
|---|---|---|---|---|---|
| | 0 | 1 | 2 | ... | N − 1 |
| 0 | 1 | g(0,1) | g(0,2) | ... | g(0,N − 1) |
| 1 | g(1,0) | 1 | g(1,2) | ... | g(1,N − 1) |
| 2 | g(2,0) | g(2,1) | 1 | | g(2,N − 1) |
| . | . | . | . | | . |
| N − 1 | g(N − 1,0) | g(N − 1,1) | g(N − 1,2) | | 1 | where:

$$g(i,j) \approx \begin{cases} \dfrac{SMIN_j}{SMAX_i} & j > i \\ 1 & j = i \\ \dfrac{SMAX_j}{SMIN_i} & j < i \end{cases}$$

This ensures that the configuration change will not create discontinuous jumps in the rate or distortion level of the reconstructed signal, which is advantageous over the methods described in the prior art.

Figure 6:
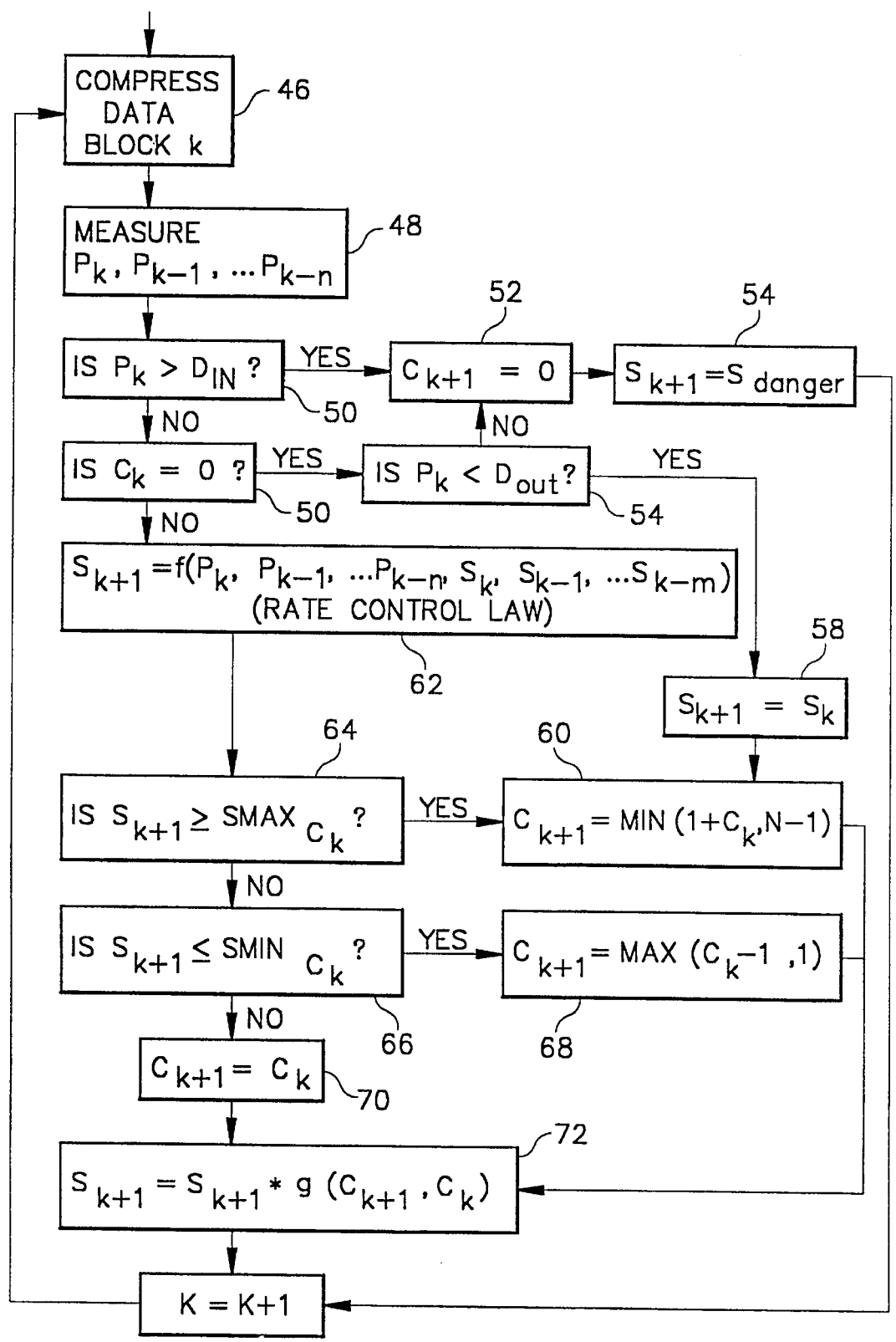
FIG. 6 is a block diagram showing the logic flow of a rate controller according to the present invention.
Figure 7:
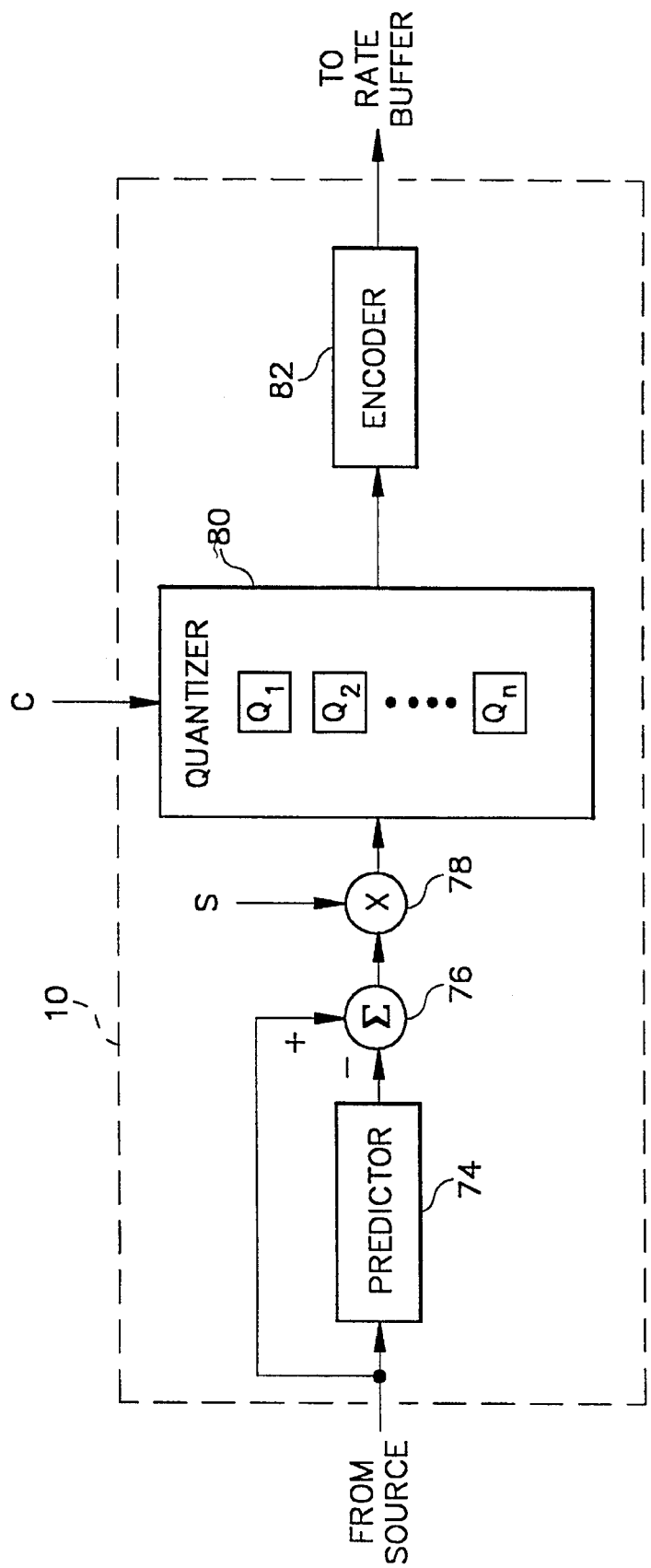
FIG. 7 is a block diagram showing a DPCM compression module useful with the present invention.

A flowchart outlining the steps in the rate control process is shown in FIG. 6, which proceeds as follows:

(1) The compression module 10 processes the kth block of data, and outputs the compressed data into the rate buffer 14, step (46).

(2) The rate controller 20 measures the buffer fill fraction ($P_k$, $0 \leq P_k \leq 1$), and stores n previous buffer fill fractions from $P_{k-n}$ to $P_k$. If k<n, then $P_{k-n}=P_{k-n+1}=\ldots=P_0=0.5$ step (48).

(3) The buffer fill fraction $P_k$ is compared to a danger configuration entrance threshold $D_{in}$ (50). If $P_k > D_{in}$, then the rate buffer is in danger of imminent overflow. To guard against this, the new value of the configuration select signal ($C_{k+1}$) is set to 0 (52), which instructs the compression module to enter the special danger configuration that prevents the buffer from overflowing. The control signal $S_{k+1}$ is set equal to an appropriate value ($S_{danger}$) for the danger configuration (54), and the compression module processes the next block of data.

(4) To prevent possible oscillation of the configuration in and out of the danger configuration, a separate threshold ($D_{out}$) is used determine when to switch out of the danger configuration. Thus, if $P_k > D_{out}$ and the current configuration ($C_k$) is 0 (danger), then $C_{k+1}$ is set to 0 (52), and the compression module remains in the danger configuration. If $P_k<D_{out}$ (54) and C=0 (54), then the control signal $S_{k+1}$ is set to $S_k$ (58) and $C_{k+1}$ is set to the minimum of $1+C_k$ and N−1 (60)/When $C_k=0$, this will be equal to 1, which is the configuration closest in performance to the danger configuration.

(5) If $C_k$ is not 0, then $S_{k+1}$ is computed from a function of the m+1 previous control signal values, $S_k, S_{k-1}, \ldots, S_{k-m}$, and the n+1 previous buffer fill fractions, $P_k, P_{k-1}, \ldots, P_{k-n}$ (62). This governing equation is called the rate control law.

(6) The control signal $S_{k+1}$ is compared to the upper control signal threshold for the current configuration, Smax($C_k$) (64). If $S_{k+1}>$Smax($C_k$), then the configuration is incremented by 1 and clipped at the number of available configurations which is N−1 ($C_{k+1}$=MIN($C_k$+1,N)) (60). Recall that the higher configurations are for higher rate/lower distortion performance than the lower configurations.

(7) If the control signal $S_{k+1}$ is less than the lower control signal threshold for the current configuration, Smin($C_k$) (66), then the configuration is decremented by 1 and clipped at configuration 1, which is the lowest available ($C_{k+1}$=MAX($C_k$−1,1) (68).

(8) If Smin($C_k$)<$S_{k+1}$<Smax($C_k$), then the configuration is not changed (70).

(9) Finally, $S_{k+1}$ is multiplied by a configuration change scaler, g ($C_{k+1}$, $C_k$) (72). This has the function of modifying the value of $S_{k+1}$ so that the performance point of the compression module remains relatively constant upon a configuration change. g($C_{k+1}$, $C_k$)= Smin($C_{k+1}$)/Smax($C_k$) if $C_{k+1}>C_k$, and g($C_{k+1}$, $C_k$)= Smax($C_{k+1}$)/Smin($C_k$) if $C_{k+1}<C_k$. Also, g($C_{k+1}$, $C_k$)=1 if $C_{k+1}=C_k$.

A rate controller according to the present invention is useful for controlling the differential pulse code modulation (DPCM) compression technique, described in co-pending U.S. patent application Ser. No. 08/410,462, entitled "A Method For Adaptively Compressing Residual Digital Image Data in a DPCM Compression System" by Bhavan R. Gandhi et al. In a preferred embodiment, the rate controller is a microprocessor which has been programmed with the logic flow of FIG. 6. A first feedback signal S (control signal) and a second feedback signal C (configuration select signal) are communicated to an application specific integrated circuit (ASIC) which is programmed with the logic of the compression scheme outlined in the co-pending patent application. The output of the compression module ASIC is fed into a memory circuit which serves as a rate buffer. The fill conditions of the rate buffer memory are then monitored by the rate controller, which closes the loop. The co-pending patent application describes a DPCM compression scheme which possesses multiple configurations, each of which is defined by a set of quantizers.

The DPCM compression module includes a predictor 74 that receives data from the source and predicts the value of the source signal. The differences between the predicted value and the actual value, called prediction errors, are taken in a subtractor 76.

The prediction errors are multiplied by the control signal S from the rate controller in multiplier 78 prior to quantization in quantizer 80.

Quantizer 80 is responsive to the configuration select signal C to select one of the multiple quantizer configuration $Q \ldots Q_n$. The quantized prediction error signals are encoded in an encoder and sent to the rate buffer.

In this way, increasing the value of the control signal S will increase the value of the prediction errors, which will result in a higher bit rate due to the longer codewords that are used to encode the larger errors. Similarly, decreasing the value of the control signal will reduce the bit rate due to the shorter codewords that are used to encode smaller errors. Thus, the rate controller can control the bit rate within a given configuration by varying the value of the control signal S. The quantizer configuration is also selected by the rate controller and is changed by modifying the value of the configuration select signal C. The rate controller determines when it is necessary to change the configuration based on rate distortion data which is collected for each configuration as part of a training process. The training process involves processing data from representative sources with the compression module, measuring the position of the intersection points of the rate distortion curves for the different configurations of the compression module, and using the measured points to determine the values of the table entries for Tables 1 and 2. The value of the control signal and configuration select signal are then encoded into the bitstream as overhead, and transmitted for use in the decoder.

This invention has been described with reference to a preferred embodiment. However, it will be appreciated that variations and modification can be effected by a person of ordinary skill in the art without departing from the scope of the invention.

A program written in the C programming language for programming a microprocessor having a UNIX based operating system is attached hereto as Appendix A.

APPENDIX A

This section of the document describes the parameters that are used to control the rate control module of the compression algorithm. These parameters are contained in a data file which is parsed by a routine that searches for keywords that define the variables in the rate control module. The following text describes the keywords, their definitions, and the variables that they control in the rate control algorithm.

buffer_size

This keyword is the size of the rate control buffer in bytes. Entering a -1 value for this parameter will signal the algorithm to automatically determine the size of the rate control buffer based on the information contained in the compression control and image description files.

divisor

This keyword defines the quantization for the band scale factors, and is used to simulate certain hardware implementation features such as table lookups and integer arithmetic. A value of N for the divisor means that the scale factors will be quantized to multiples of 1/N.

control_level

This keyword defines the level in the rate control buffer which the rate controller will attempt to maintain. The control level is normalized to be between 0 and 1, and is nominally 0.5.

GainA

This keyword defines the gain that is used to multiply the weighted sum of the previous scale factors in the rate control law.

GainB

This keyword defines the gain that is used to multiply the weighted sum of the previous buffer pointer values in the rate control law.

CoefA

This keyword defines the coefficients that are used to weight the previous value of the scale factor in the control law. The number of columns of coefficients must be 3, where the column defines the coefficients to use at the buffer empty, middle, and full points respectively. The coefficients for intermediate buffer values will be interpolated from the values in this table. Each column should sum to 1, although the individual coefficients need not be positive.

CoefB

This keyword defines the coefficients that are used to weight the previous values of the buffer pointer in the control law. The number of columns of coefficients must be 3, where the column defines the coefficients to use at the buffer empty, middle, and full points respectively. The coefficients for intermediate buffer values will be interpolated from the values in this table. The values of the coefficients in this table will determine the location of the poles in the control loop.

enter_danger_threshold

This keyword defines a threshold on the normalized buffer pointer for each band upon which the band will enter danger mode when the threshold is exceeded.

exit_danger_threshold

This keyword defines a threshold on the normalized buffer pointer for each band upon which the band will exit danger mode when the buffer pointer drops below the threshold.

mode_scale_table

This keyword defines a table of scale factors that are used to modify the band scaler when a band changes mode. The columns of the table represent the new mode and the rows represent the current mode. The diagonal of this table should be 1's. Any hysteresis that is built in to the mode transitions (about 10% is recommended) is determined by the coefficients in this table.

scale_min_table

This keyword defines the minimum scale factor that is allowed in each mode. When the band scale factor for a given mode hits the minimum value, the mode that the band is compressing in is decremented, and the band scale factor is modified according to the mode scale table.

scale_max_table

This keyword defines the maximum scale factor that is allowed in each mode. When the band scale factor for a given mode hits the maximum value, the mode that the band is compressing in is incremented, and the band scale factor is modified according to the mode scale table.

importance_min

This keyword defines the minimum importance value for a given mode. This is used in conjunction with the band importance and the importance_max to determine which mode a given band starts off in at the beginning of the compression.

importance_max

This keyword defines the maximum importance value for a given mode. This is used in conjunction with the band importance and the importance_min to determine which mode a given band starts off in at the beginning of the compression.

APPENDIX A

Listing for Doug Couwenhoven                         Fri Sep 23 13:52:57 1994   Page 1

```
#*********************************************************************
# file: LSAT_RATE.DAT

# Rate control parameters for ADPCM algorithm.
# This file must be specified in the application file.

# Rev. Hist:
# v. author(s)     date      comment
# 0. D. Couwenhoven 02/22/93  original version
# 1. D. Couwenhoven 04/07/93  added scale_init_table
# 2. D. Couwenhoven 04/13/93  made filter more flexible
# 3. D. Couwenhoven 05/03/93  added danger thresholds
# 4. D. Couwenhoven 06/03/93  added non-linear gain control
# 5. D. Couwenhoven 09/15/93  stripped down version
********************************************************************* buffer_size   225280   # Buffer size in bytes (-1 for Auto Buffer Sizing)
divisor       16       # Divisor value for integer arithmetic
control_level 0.50     # Buffer control point ( 0 < control_level < 1 )

# Feedback Control Coefficients
# s(n) = 2^( GainA * ( CoefA(0)*log2(s(n-1)) + CoefA(1)*log2(s(n-2)) + ...) +
#            GainB * ( CoefB(0)*p(n-1)      + CoefB(1)*p(n-2)      + ...) )
# where s(n) is the master scale factor for the nth line, offset by
#       the control_level
p(n) is the buffer full fraction for the nth line GainA   1.00
GainB  20.00
CoefA   2
        0.50   0.50   # CoefA(0) @ Buffer Empty, Middle, Full
        0.50   0.50   # CoefA(1) @ Buffer Empty, Middle, Full
CoefB   2
       -1.01  -1.01   # CoefB(0) @ Buffer Empty, Middle, Full
        1.00   1.00   # CoefB(1) @ Buffer Empty, Middle, Full

# Enter Threshold table - These are the thresholds at which the danger mode is
#                        entered for each band when the buffer.
enter_danger_threshold 16
  0.900 0.900 0.900 0.900 0.900 0.900 0.900 0.900
  0.900 0.900 0.900 0.900 0.900 0.900 0.900 0.900

# Exit Threshold table - These are the thresholds at which the buffer is
#                       exited for each band when the buffer is emptying. If these are the same
#                       as the enter threshold, then there is no hysteresis upon mode changes.
exit_danger_threshold 16
  0.800 0.800 0.800 0.800 0.800 0.800 0.800 0.800
  0.800 0.800 0.800 0.800 0.800 0.800 0.800 0.800

# Mode change scaler table
mode_scale_table
  6
  1.000 0.250 1.000 1.000 1.000 1.000   # m0
  4.000 1.000 0.367 1.000 1.000 1.000   # m1
  1.000 2.725 1.000 0.562 1.000 1.000   # m2
  1.000 1.000 1.778 1.000 0.619 1.000   # m3
  1.000 1.000 1.000 1.615 1.000 0.825   # m4
  1.000 1.000 1.000 1.000 1.212 1.000   # m5
  m0    m1    m2    m3    m4    m5
#                                        From

# Minimum Band Scale Factor
scale_min_table
  6
  1.000 0.250 0.500 1.150 2.070 3.000
  m0    m1    m2    m3    m4    m5

# Maximum Band Scale Factor
scale_max_table
  6
  1.000 1.500 2.250 3.680 4.000 4.000
  m0    m1    m2    m3    m4    m5

# Importance Function - Mode Thresholds
importance_min
  6
  0.000 1.000 2.000 3.000 4.000 5.000
  m0    m1    m2    m3    m4    m5 importance_max
  6
  1.000 2.000 3.000 4.000 5.000 6.000
  m0    m1    m2    m3    m4    m5
```

APPENDIX A

Listing for Doug Couwenhoven  Fri Sep 23 13:52:17 1994  Page 1

```
/*******************************************************
 *          COPYRIGHT EASTMAN KODAK COMPANY, 1993
 *                  ALL RIGHTS RESERVED
 *******************************************************/

/* Filename:    r21rate.c
 *
 * Description: This file contains the rate control routines for the RADC20
 *              algorithm.
 *
 * Disclaimer:  At this time, the RADC20 library is still being developed, so
 *              it may be necessary to modify the RADC20 interface at some
 *              point. We hope that any changes will be very small.
 *******************************************************/

/* Include files
 *******************************************************/
#include <stdio.h>
#include <stdlib.h>
include <math.h> include "lsparser.h"

/*******************************************************
 * External Variable Definitions
 *******************************************************/
#ifdef COLLECT_RATE_STATS
extern double mse[ RADC_MAX_BANDS ];
extern int    rmse;
extern double bit_rate;
endif /* Symbolic Definitions
 *******************************************************/
#define CLIP(a,b,c)           (MAX(MIN((a),MAX((b),(c))),MIN((b),(c))))
#define FILTER_SIZE           2
#define LO_NUMBER             -1
#define HI_NUMBER             1000
#define MAX_MODES             7
#define MAX_SCALE_TABLE_SIZE  32
#define NONLINEAR_TABLE_SIZE  3
#define LOG2(a)               log((double)(a))/log(2)
#define EXP2(a)               pow(2,(double)(a))

/* Structure Definitions
 *******************************************************/
struct table
{
    int num_pts;
    float x[ MAX_SCALE_TABLE_SIZE ];  /* X values */
    float y[ MAX_SCALE_TABLE_SIZE ];  /* Y values */
};

struct nonlinear_table
{
    struct table data;                              /* Coef vs Buf Ptr curve data    */
    float lo_coef[ NONLINEAR_TABLE_SIZE ];          /* Coefs for buf empty quadratic */
    float hi_coef[ NONLINEAR_TABLE_SIZE ];          /* Coefs for buf full quadratic  */
};

struct rate_file_data
{
    long   divisor;
    float  control_level;
    unsigned long buffer_size;
    float  ga;
    float  gb;
    struct nonlinear_table a[ FILTER_SIZE ];
    struct nonlinear_table b[ FILTER_SIZE ];
    int    num_modes;
    float  scale_min[ MAX_MODES ];
    float  scale_max[ MAX_MODES ];
    float  master_lo_clip;
    float  master_hi_clip;
    float  enter_danger[ RADC_MAX_BANDS ];
    float  exit_danger[ RADC_MAX_BANDS ];
    float  mode_scale[ MAX_MODES ][ MAX_MODES ];
    float  imp_min[ MAX_MODES ];
    float  imp_max[ MAX_MODES ];
};

/*******************************************************
 * Global Variable Definitions
 *******************************************************/
static struct rate_file_data input_data;
static float s[ FILTER_SIZE + 1 ],bp[ FILTER_SIZE ];
static int   nstripe=0;
#ifdef COLLECT_RATE_STATS
FILE   *sfp;
double tmse[ RADC_MAX_BANDS ];
double bs[ RADC_MAX_BANDS ];
double br[ RADC_MAX_BANDS ];
double rmse;
endif /*******************************************************
 * Static Function Definitions
 *******************************************************/
static int read_rate_file( FILE *, struct rate_file_data * );

/*******************************************************
 * Name:        read_rate_file
 *
 * Description: This routine will read in the rate control parameters for
 *              each band from the rate control data file.
 *
 * Variables:
```

APPENDIX A

Listing for Doug Couwenhoven                    Fri Sep 23 13:52:17 1994    Page 2

```
/****************************************************************
 * input:  fp - pointer to the already open file of parameters
 * output: data - structure containing parameters
 * return: none
 *
 * Rev. Hist:
 *   author(s)        date       comment
 * v. D. Couwenhoven  02/16/93   original version
 * 0. D. Couwenhoven  05/28/93   moved importance and mode flgs to appl.
 * 1.
 ****************************************************************/
static int
read_rate_file( FILE *fp, struct rate_file_data *data )
{
    unsigned long val;
    float fval;
    int i, j, cmd, cols;
    static char param[80];
    static char *cmd_table[] =
    { "scale_min_table", "scale_max_table", "divisor", "buffer_size",
      "CoefA", "CoefB", "GainA", "GainB",
      "control_level", "enter_danger_threshold", "exit_danger_threshold",
      "mode_scale_table", "importance_min", "importance_max"
    };

while( !feof( fp ) )
    {
        if( !fscanf( fp ) )
            break;

RADC_STATUS( RADC20_parse( fp, cmd_table, 14, &cmd, param ) );

val  = (unsigned long) atol( param );
        fval = (float) atof( param );

switch( cmd )
        {
        case 0: /* scale_min_table */
            if( val > MAX_MODES )
                RADC_STATUS( RADC_RATE_INIT_ERROR );
            if( data->num_modes == 0 )
                data->num_modes = val;
            else if( val != data->num_modes )
                RADC_STATUS( RADC_SCALE_INIT_ERROR );
            RADC_STATUS( RADC20_read_float_list( fp, val,
                                          data->scale_min ) );
            break;

case 1: /* scale_max_table */
            if( val > MAX_MODES )
                RADC_STATUS( RADC_RATE_INIT_ERROR );
            if( data->num_modes == 0 )
                data->num_modes = val;
            else if( val != data->num_modes )
                RADC_STATUS( RADC_SCALE_INIT_ERROR );
            RADC_STATUS( RADC20_read_float_list( fp, val,
                                          data->scale_max ) );
            break;

case 2: /* divisor */
            data->divisor = val;
            break;

case 3: /* buffer_size */
            data->buffer_size = val;
            break;

case 4: /* CoefA */
            for(i=0;i<val;i++)
            {
                data->a[i].data.num_pts = NONLINEAR_TABLE_SIZE;
                RADC_STATUS( RADC20_read_float_list( fp,
                             NONLINEAR_TABLE_SIZE, data->a[i].data.y ) );
            }
            break;

case 5: /* CoefB */
            for(i=0;i<val;i++)
            {
                data->b[i].data.num_pts = NONLINEAR_TABLE_SIZE;
                RADC_STATUS( RADC20_read_float_list( fp,
                             NONLINEAR_TABLE_SIZE, data->b[i].data.y ) );
            }
            break;

case 6: /* GainB */
            data->gb = fval;
            break;

case 7: /* GainA */
            data->ga = fval;
            break;

case 8: /* control_level */
            data->control_level = fval;
            break;

case 9: /* enter_danger_threshold */
            if( val > RADC_MAX_BANDS )
                RADC_STATUS( RADC_RATE_INIT_ERROR );
            RADC_STATUS( RADC20_read_float_list( fp, val,
                                          data->enter_danger ) );
            break;

case 10: /* exit_danger_threshold */
            if( val > RADC_MAX_BANDS )
                RADC_STATUS( RADC_RATE_INIT_ERROR );
            RADC_STATUS( RADC20_read_float_list( fp, val,
                                          data->exit_danger ) );
            break;

case 11: /* mode_scale_table */
            if( val > MAX_MODES )
                RADC_STATUS( RADC_RATE_INIT_ERROR );
            fscanf(fp, "%d", &cols);
            if( cols != MAX_MODES )
                RADC_STATUS( RADC_RATE_INIT_ERROR );
            if( data->num_modes == 0 )
                data->num_modes = val;
            else if( val != data->num_modes )
```

APPENDIX A

Listing for Doug Couwenhoven     Fri Sep 23 13:52:17 1994     Page 3

```
                printf("\nError - NUM_MODES do not match.\n");
                RADC_STATUS( RADC_SCALE_INIT_ERROR );
            }
            for(i=0;i<val;i++)
                RADC_STATUS( RADC20_read_float_list( fp, cols,
                                            data->mode_scale[i] ) );
            break;

case 12: /* importance min */
            if( val > MAX_MODES )
                RADC_STATUS( RADC_RATE_INIT_ERROR );
            if( data->num_modes == 0 )
                data->num_modes = val;
            else if( val != data->num_modes )
                RADC_STATUS( RADC_SCALE_INIT_ERROR );
            RADC_STATUS( RADC20_read_float_list( fp, val,
                                            data->imp_min ) );
            break;

case 13: /* importance max */
            if( val > MAX_MODES )
                RADC_STATUS( RADC_RATE_INIT_ERROR );
            if( data->num_modes == 0 )
                data->num_modes = val;
            else if( val != data->num_modes )
                RADC_STATUS( RADC_SCALE_INIT_ERROR );
            RADC_STATUS( RADC20_read_float_list( fp, val,
                                            data->imp_max ) );
            break;

default:
            RADC_STATUS( RADC_RATE_INIT_ERROR );
            break;
        } /* end of switch */
    } /* end of while */
    return RADC_SUCCESS;
}

/******************************************************************
*
*   Name:       RADC20_init_nonlinear_factor
*
*   Description: This subroutine initializes the coefficients that are used in
*                the non-linear control law. The coefficients will change as a
*                function of the buffer pointer, thereby changing the response of
*                the rate controller based on the buffer pointer. Two control
*                regions are defined: one to be used when the buffer is below
*                the control point, and the other to be used when the buffer is
*                above the control point. The coefs at the empty, control, and
*                full points are specified in the rate control data file, and
*                quadratic functions are fit to these three points with the
*                condition that the slope of the coef curve be zero at the
*                control point.
*
*   Variables:
*       Input:  nonlinear table structure (from input_data)
*
*       Output: none
*       Return: none
*
*       Rev. Hist:
*           v.  author(s)       date        comment
*           0.  D. Couwenhoven  06/02/93    original version
*
******************************************************************/
int
RADC20_init_nonlinear_factor( struct nonlinear_table *coef )
{
    /*
    *   Check for the proper number of coef points
    */
    if( coef->data.num_pts != NONLINEAR_TABLE_SIZE ){
        printf("\nError - %d coef points must be specified.\n",
                    NONLINEAR_TABLE_SIZE);
        RADC_STATUS( RADC_RATE_INIT_ERROR );
    }

/*
    *   Initialize the x values for the nonlinear table data, although they are not
    *   currently used.
    */
    coef->data.x[0] = 0;
    coef->data.x[1] = input_data.control_level;
    coef->data.x[2] = 1.0;

/*
    *   Solve for the quadratic coefficients of the coef function when the buffer
    *   is below the control level.
    */
    coef->lo_coef[0] = coef->data.y[0];
    coef->lo_coef[1] = -2*( coef->data.y[1] - coef->data.y[0] ) /
                            input_data.control_level;
    coef->lo_coef[2] = ( coef->data.y[0] - coef->data.y[1] ) /
                            ( input_data.control_level * input_data.control_level );

/*
    *   Solve for the quadratic coefficients of the coef function when the buffer
    *   is above the control level.
    */
    coef->hi_coef[0] = coef->data.y[1] + ( coef->data.y[2] -
                            coef->data.y[1] ) * input_data.control_level *
                            input_data.control_level /
                            ( input_data.control_level - 1 ) *
                            ( input_data.control_level - 1 );
    coef->hi_coef[1] = 2 * input_data.control_level * ( coef->data.y[1] -
                            coef->data.y[2] ) /
                            ( input_data.control_level - 1 ) *
                            ( input_data.control_level - 1 );
    coef->hi_coef[2] = ( coef->data.y[2] - coef->data.y[1] ) /
                            ( input_data.control_level - 1 ) *
                            ( input_data.control_level - 1 );
}

/******************************************************************
```

APPENDIX A

Listing for Doug Couwenhoven  Fri Sep 23 13:52:17 1994  Page 4

```
*  Name:        RADC20_calc_nonlinear_factor
*
*  Description: This subroutine calculates the coefficients that are used in
*               the non-linear control law. The coefficients will change as a
*               function of the buffer pointer, therby changing the response of
*               the rate controller based on the buffer pointer. A full buffer
*               will generally require a faster control response, while an
*               empty buffer can use a slower control law.
*
*  Variables:
*     input:    coefficient array (from input_data), buffer pointer
*     output:   none
*     return:   coefficient to be used in control law
*
*  Rev. Hist:         date       comment
*     v.  author(s)
*     0.  D. Couwenhoven 06/02/93   original version
*
***********************************************************************/
float
RADC20_calc_nonlinear_factor( struct nonlinear_table *coef, float buf_ptr )
{
    float g;

if( buf_ptr < input_data.control_level ){
        g = coef->lo_coef[0] + coef->lo_coef[1]*buf_ptr +
            coef->lo_coef[2]*buf_ptr*buf_ptr;
    } else {
        g = coef->hi_coef[0] + coef->hi_coef[1]*buf_ptr +
            coef->hi_coef[2]*buf_ptr*buf_ptr;
    } return( g );
}

/***********************************************************************
*
*  Name:        RADC20_find_master_scale_limits
*
*  Description: This subroutine determines the limits for the master scale
*               factor.
*
*  Variables:
*     input:    pointer to rate control parameter structure
*     output:   Master limits stored in global input data structure
*     return:   RADC_SUCCESS
*
*  Rev. Hist:         date       comment
*     v.  author(s)
*     0.  D. Couwenhoven 08/02/93   original version
*
***********************************************************************/
int
RADC20_find_master_scale_limits( struct RADC20_rate_param *param )
{
    int band,mode,i;
    int lo_flag,hi_flag;
    float tmp;

/*
    *  Determine if all of the importance factors are larger or smaller than 1
    */
    lo_flag = TRUE;
    hi_flag = TRUE;
    for( band = 0; band < param->num_bands; band++ )
    {
        if( param->importance[ band ] >= 1.00 )
            lo_flag = FALSE;
        if( param->importance[ band ] <= 1.00 )
            hi_flag = FALSE;
    }

/*
    *  If all of the importance functions are on the same side of 1, re-scale
    *  the importance functions and the master scale history (thus, effectively,
    *  the master scaler).
    */
    if( lo_flag || hi_flag )
    {
        tmp = 0;
        for( band = 0; band < param->num_bands; band++ )
            tmp += param->importance[ band ];
        tmp /= param->num_bands;
        for( band = 0; band < param->num_bands; band++ )
            param->importance[ band ] /= tmp;
        for( i=0; i < FILTER_SIZE; i++ )
            s[FILTER_SIZE-1] *= tmp;
    }

/*
    *  Determine the minima for the master scale factor by finding the minimum
    *  ratio of band scaler for the current mode to importance across the bands.
    */
    input_data.master_lo_clip = HI_NUMBER;
    for( band = 0; band < param->num_bands; band++ )
    {
        tmp = input_data.scale_min[ param->mode_flags[ band ] ] /
                                    param->importance[ band ];
        if( tmp < input_data.master_lo_clip )
            input_data.master_lo_clip = tmp;
    }
    input_data.master_lo_clip = MAX( input_data.master_lo_clip, 0.01 );

/*
    *  Determine the maxima for the master scale factor by finding the maximum
    *  ratio of band scaler for the current mode to importance across the bands.
    */
    input_data.master_hi_clip = LO_NUMBER;
    for( band = 0; band < param->num_bands; band++ )
    {
        tmp = input_data.scale_max[ param->mode_flags[ band ] ] /
                                    param->importance[ band ];
        if( tmp > input_data.master_hi_clip )
            input_data.master_hi_clip = tmp;
    } return RADC_SUCCESS;
}
```

Listing for Doug Couwenhoven          APPENDIX A          Fri Sep 23 13:52:17 1994   Page 5

```
/****************************************************************
*
*    Name:        RADC20_init_importance
*
*    Description: This subroutine normalizes the importance functions so that
*                 they sum to the number of bands.
*
*    Variables:
*       input:    Pointer to rate control parameter structure
*       output:   Normalized importance functions stored in rate control param.
*       return:   RADC_SUCCESS
*
*    Rev. Hist:
*       author(s)              date        comment
*    0. D. Couwenhoven        08/02/93    original version
*
****************************************************************/
int
RADC20_init_importance( struct RADC20_rate_param *param )
{
    int band, mode, mode_init;
    float start[ RADC_MAX_BANDS ], tmp;
    float scale_init_min[ MAX_MODES ];
    float scale_init_max[ MAX_MODES ];

/*
    * If there is hysteresis in the scale factors upon mode transition, i.e.,
    * the scale max of the current mode does not map to the scale min of the
    * next higher mode and vice versa, etc. then there exists the possibility
    * that bands specified with initial importance values near the boundary of
    * a mode threshold may invert importance upon mode changes. This can be
    * corrected by imposing new limits on the band scale factors.
    */
    for( mode = 0; mode < param->num_modes; mode++ )
    {
        scale_init_min[ mode ] = input_data.scale_min[ mode ];
        scale_init_max[ mode ] = input_data.scale_max[ mode ];
    }
    for( mode = 0; mode < param->num_modes - 1; mode++ )
    {
        tmp = ( input_data.scale_max[ mode ] +
                input_data.mode_scale[ mode+1 ][ mode+1 ] -
                input_data.scale_min[ mode+1 ] ) /
              ( 1 + input_data.mode_scale[ mode ][ mode+1 ] );

scale_init_min[ mode+1 ] = input_data.scale_min[ mode+1 ] + tmp;
        scale_init_max[ mode ]   = input_data.scale_max[ mode ] - tmp;
    }

/*
    * Determine what mode each band will start off in based on the specified
    * importance function value.  Interpolate the initial band scale factor
    * from the band scale extrema for the given mode.
    */
    for( band = 0; band < param->num_bands; band++ )
    {
        for( mode = 0; mode < num_modes; mode++ )
            if( param->importance[ band ] >= input_data.imp_min[ mode ] )
                mode_init = mode;

param->mode_flags[ band ] = mode_init;

start[ band ] = EXP2( ( param->importance[ band ] -
                          input_data.imp_min[ mode_init ] ) /
                        ( input_data.imp_max[ mode_init ] -
                          input_data.imp_min[ mode_init ] ) *
                        ( LOG2( scale_init_max[ mode_init ] ) -
                          LOG2( scale_init_min[ mode_init ] ) ) +
                          LOG2( scale_init_min[ mode_init ] ) );
    }

/*
    * Set the master scale factor to the average of the initial band scale
    * factors.
    */
    param->master = 0;
    for( band = 0; band < param->num_bands; band++ )
        param->master += start[ band ];
    param->master /= param->num_bands;

/*
    * Re-define the initial importance functions in terms of the master scaler.
    */
    for( band = 0; band < param->num_bands; band++ )
        param->importance[ band ] = start[ band ] / param->master;

return RADC_SUCCESS;
}

/****************************************************************
*
*    Name:        RADC20_rate_control_init
*
*    Description: This function will initialize the rate control module for the
*                 RADC20 algorithm.
*
*    Variables:
*       input:    param       rate control structure
*       input:    file        rate control data filename
*       output:   param       rate control structure
*       return:   RADC_SUCCESS
*
*    Rev. Hist:
*       author(s)              date        comment
*    0. D. Couwenhoven        02/16/93    original version
*    1. D. Couwenhoven        04/07/93    added RADC20_interp_scale
*    2. D. Couwenhoven        04/13/93    initialize filter parameters
*
****************************************************************/
int
RADC20_rate_control_init( struct RADC20_rate_param *param,
                          LPO_Comp_Data *LPO_CDat,
                          struct RADC20_param *LPO_IDat )
```

APPENDIX A

Listing for Doug Couwenhoven  Fri Sep 23 13:52:17 1994  Page 6

```c
    FILE *fp;
    int i,j,error,inflow,band;
    float sum,pole;

/*
 * Open and read the input data file
 */
    fp = fopen( LPO_CDat->rateControlFile, "r" );
    if ( fp == NULL )
        RADC_STATUS( RADC_OPEN_ERROR );
    error = read_rate_file( fp, &input_data );

fclose( fp );
    RADC_STATUS( error );

#ifdef COLLECT_RATE_STATS
    sfp = fopen("rate_stats","w");
    if ( sfp == NULL )
        RADC_STATUS( RADC_OPEN_ERROR );
    for(i=0;i<RADC_MAX_BANDS;i++)
    {
        tmse[i] = 0;
        b[i] = 0;
        br[i] = 0;
    }
endif /*
 * Make sure that the number of modes match between rate controller and the
 * application.
 */
    if( param->num_modes != input_data.num_modes )
    {
        printf("\nError - Number of modes do not match with application\n");
        RADC_STATUS( RADC_RATE_INIT_ERROR );
    } if( param->num_modes > MAX_MODES )
    {
        printf("\nError - Too many rate control modes specified\n");
        RADC_STATUS( RADC_RATE_INIT_ERROR );
    }

/*
 * If buffer size is to be selected automatically, calculate the buffer size
 * to be large enough to store eight full stripes of all the bands.
 */
    for( inflow = 0, band=0; band<LPO_IDat->num_bands; band++ )
        inflow += ( LPO_IDat->band[band].nsamples *
                    LPO_IDat->band[band].bit_depth *
                    LPO_IDat->band[band].rows_per_line *
                    LPO_CDat->linesPerStripe );

if( input_data.buffer_size == -1 )
        input_data.buffer_size = inflow;
    else if( input_data.buffer_size < inflow )
        printf("\nWarning: Buffer size of %d bytes or larger is recommended.\n",
               inflow );
    printf("\nSelected rate buffer size is %d bytes.\n",
           input_data.buffer_size );

/*
 * Check to make sure that the pole location is within the unit circle.
 */
    for( j=0; j<NONLINEAR_TABLE_SIZE; j++ )
    {
        pole = -1.0 * input_data.b[1].data.y[j] / input_data.b[0].data.y[j];
        if( pole <= -1.0 || pole >= 1.0 )
        {
            printf("\nWarning! Rate Control Feedback Pole location is %f", pole );
            printf("\nThe pole location is found by computing -B1/B0.");
            printf("\nAdjust B0, B1 so this is inside the unit circle\n");
        }
    }

/*
 * Check to make sure that the scale factor feedback gain is unity.
 */
    for( j=0; j<NONLINEAR_TABLE_SIZE; j++ )
    {
        sum = input_data.ga * ( input_data.a[0].data.y[j] +
                                input_data.a[1].data.y[j] );
        if( sum < 0.9999 || sum > 1.0001 )
        {
            printf("\nWarning! Scale Factor Feedback Gain is %f", sum );
            printf("\nAdjust A0, A1, GainA so GainA * ( A0 + A1 ) - 1.0\n");
        }
    }

/*
 * Set the buffer pointer to point to the center of the buffer
 */
    param->buffer_pointer = (long)( input_data.control_level *
                                    input_data.buffer_size );

/*
 * Check to see that importance factors sum to num_bands, and normalize if
 * necessary.  The initial master scale factor is also computed here.
 */
    RADC20_init_importance( param );

/*
 * Initialize the rest of the rate control parameters
 */
    param->mode_change = FALSE;
    param->divisor = input_data.divisor;
    for(i=0;i<param->num_bands;i++){
        param->scale[i] = (long)( param->master *
                                  param->importance[i] *
                                  input_data.divisor );
        param->scale[i] = CLIP( param->scale[i], param->mode_flags[i] ) *
                          MAX( input_data.scale_min, param->mode_flags[i] ) *
                          input_data.scale_max( param->mode_flags[i] ) *
                          input_data.divisor );
    }

/*
 * Set the initial feedback loop variables
 */
```

APPENDIX A

Listing for *Doug Couwenhoven*          Fri Sep 23 13:52:17 1994          Page 7

```c
        for( i=0; i < ( FILTER_SIZE + 1 ); i++ )
            s[i] = param->master;
        for( i=0; i < FILTER_SIZE; i++ )
        {
            RADC20_init_nonlinear_factor( input_data.a[i] );
            RADC20_init_nonlinear_factor( input_data.b[i] );
            bp[i] = input_data.control_level;
        }
        /*
        ** Find the limits on the master scale factor
        */
        RADC20_find_master_scale_limits( param );

return RADC_SUCCESS;
    }

/*****************************************************************
**
** Name:        RADC20_rate_control
**
** Description: This routine is the main rate control function for the
**              RADC20 algorithm.
**
** Variables:
**    input:    param  (rate control param structure)
**    output:   param  (rate control param structure)
**    return:   RADC_SUCCESS
**
** Rev. Hist:
** v.   author(s)         date       comment
** 0.   D. Couwenhoven    02/16/93   original version
** 1.   D. Couwenhoven    03/22/93   added mode flags flags
** 2.   D. Couwenhoven    04/13/93   made filter more flexible
** 3.   D. Couwenhoven    05/03/93   added danger modes
**
*****************************************************************/
int
RADC20_rate_control( struct RADC20_rate_param *param )
{
    int i,j,n,new_mode, current_mode, band;
    float a[ FILTER_SIZE ], b[ FILTER_SIZE ];
    float stmp;

n = (int) ( FILTER_SIZE );

if( nstripe == 0 )
    {
        for( i=0; i<FILTER_SIZE; i++ )
        {
            a[i] = input_data.a[i].data.y[i];
            b[i] = input_data.b[i].data.y[i];
        }
    } ifdef COLLECT_RATE_STATS
        /* Stripe Number */
            fprintf(sfp,"%d",nstripe++);
        /* Master Scale Factor */
            fprintf(sfp," %9.6f",param->master);
        /* Band Scale Factors */
            for(i=0;i<param->num_bands;i++){
                fprintf(sfp," %9.6f",(float)param->scale[i]/param->divisor);
                bs[i] += (float)param->scale[i]/param->divisor;
            }
        /* Mode Flags */
            for(i=0;i<param->num_bands;i++)
                fprintf(sfp," %1d",param->mode_flags[i]);
        /* Buffer Pointer */
            fprintf(sfp," %6d",param->buffer_pointer);
        /* B0 Coefficient */
            fprintf(sfp," %7.3f",b[0]);
        /* Global Bit Rate */
            fprintf(sfp," %5.3f",bit_rate);
        /* RMSE */
            for(i=0;i<param->num_bands;i++)
            {
                if( nmse == 0 )
                    rmse = 0.0;
                else
                    rmse = sqrt(mse[i]*param->num_bands/nmse);
                fprintf(sfp," %6.3f",rmse);
                rmse[i] += rmse;
                mse[i] = 0.0;
            }
        /* Importance */
            for(i=0;i<param->num_bands;i++){
                fprintf(sfp," %6.3f",importance[i] );
            }
        /* Band Bit Rates */
            for(i=0;i<param->num_bands;i++){
                fprintf(sfp," %6.3f",param->byte_counter[i] );
                b[i] += param->byte_counter[i];
            }
            fprintf(sfp,"\n");
            nmse = 0;
endif /*
    ** Check for buffer overflow or underflow errors
    */
    if( param->buffer_pointer > input_data.buffer_size )
        RADC_STATUS( RADC_RATE_BUFFER_OVERFLOW );
    if( param->buffer_pointer < 0 )
        RADC_STATUS( RADC_RATE_BUFFER_UNDERFLOW );

/*
    ** Calculate buffer full fraction after last line
    */
    bp[n-1] = (float) 1.0 * param->buffer_pointer / input_data.buffer_size;

/*
    ** Reset the mode_change flag
    */
```

APPENDIX A

Listing for Doug Couwenhoven            Fri Sep 23 13:52:17 1994    Page 8

```c
    param->mode_change = FALSE;

/*
    ** Check to see if bands need to switch modes
    */
    for( band = 0; band < param->num_bands; band++ )
    {
        current_mode = param->mode_flags[ band ];
        new_mode = current_mode;

if( current_mode == 0 )
        {
            if( bp[n-1] < input_data.exit_danger[ band ] )
                new_mode = current_mode + 1;
            else
                new_mode = 0;
        }
        else if( bp[n-1] > input_data.enter_danger[ band ] )
            new_mode = 0;
        else
        {
            if( param->scale[ band ] >= (int)( input_data.divisor *
                    input_data.scale_max[ current_mode ] ) )
                new_mode = MIN( current_mode + 1, ( param->num_modes - 1 ) );
            else
                if( param->scale[ band ] <= (int)( input_data.divisor *
                        input_data.scale_min[ current_mode ] ) )
                    new_mode = MAX( current_mode - 1, 1 );
        } if( new_mode != current_mode )
        {
            param->mode_change = TRUE;
            param->mode_flags[ band ] = new_mode;
            param->importance[ band ] *=
                input_data.mode_scale[ current_mode ][ new_mode ];
            RADC20_find_master_scale_limits( param );
        }
    }

/*
    ** Calculate the coefficients to be used in the non-linear control law
    */
    for( i=0; i < FILTER_SIZE; i++ )
    {
        a[i] = RADC20_calc_nonlinear_factor( &input_data.a[i], bp[n-i] );
        b[i] = RADC20_calc_nonlinear_factor( &input_data.b[i], bp[n-i] );
    }

/*
    ** Change scale factor according to a log control law
    */
    stmp = 0;
    for( i=0; i < FILTER_SIZE; i++ )
    {
        stmp += ( input_data.ga*a[i]*LOG2(s[n-i-1]) +
                  input_data.gb*b[i] *
                  ( bp[n-i-1] - input_data.control_level ) );
    } s[n] = EXP2( stmp );

/*
    ** Clip the master scale factor according to the limits of the buffer region
    ** that we are currently operating in.
    */
    s[n] = CLIP( s[n], input_data.master_lo_clip, input_data.master_hi_clip );

param->master = s[n];

/*
    ** Determine the individual band scale factors
    */
    for(i=0;i<param->num_bands;i++)
    {
        param->scale[i] = (long)( param->master *
                                  param->importance[i] *
                                  input_data.divisor );

param->scale[i] = CLIP( param->scale[i],
                MAX( input_data.scale_min[ param->mode_flags[i] ] *
                     input_data.divisor, 1 ),
                input_data.scale_max[ param->mode_flags[i] ] *
                     input_data.divisor );
    }

/*
    ** Shift the master scale factor and buffer full fraction arrays
    */
    for( i=(FILTER_SIZE-1); i > 0 ; i-- )
    {
        s[n-i-1] = s[n-i];
        bp[n-i-1] = bp[n-i];
    }
    s[n-1] = s[n];

return RADC_SUCCESS;
}

/************************************************************************
*
*   Name:           RADC20_rate_control_close
*
*   Description:    This function contains the close routines for the rate control
*                   of the RADC20 algorithm.
*
*   Variables:
*       input:      none
*       output:     none
*       return:     RADC_SUCCESS
*
*   Rev. Hist:
*       v.  author(s)              date       comment
*       0.  D. Couwenhoven      02/16/93    original version
*
*************************************************************************/ int
```

Listing for Doug Couwenhoven  APPENDIX A  Fri Sep 23 13:52:17 1994  Page 9

```
RADC20_rate_control_close( )
{
#ifdef COLLECT_RATE_STATS
    int i;
    fclose(sfp);
    for(i=0;i<RADC_MAX_BANDS;i++)
    {
        tmse[i] /= nstripe;
        printf("\nBand %02d RMSE = %f",i,tmse[i]);
        bs[i] /= nstripe;
        printf("  Savg = %f",bs[i]);
        br[i] /= nstripe;
        printf("  Rate = %f",br[i]);
    }
    printf("\n");
#endif
    return RADC_SUCCESS;
}
```

We claim:

1. A transmitter for transmitting digital information through a channel at a fixed transmission rate, comprising:
   a) compressor means for compressing said digital information, having a plurality of operating configurations, each configuration being characterized by a unique rate distortion function, said compression means being responsive to a configuration selection signal C for operating in a selected one of said configurations and a control signal S for controlling the operating point on said rate distortion function in said selected configuration;
   b) a rate buffer means for temporarily storing compressed digital information received from said compressor means; and
   c) rate control means responsive to fill conditions of said rate buffer, said control signal S and for generating said configuration selection signal C as a function of both said fill condition and the value of said control signal S such that the average output rate of said compression means is equal to said fixed transmission rate and distortion is minimized.

2. The transmitter claimed in claim 1, wherein said rate control means generates said control signals in response to previous control signals and rate buffer fill conditions.

3. The transmitter claimed in claim 1, wherein said compressor means is a differential pulse code modulation (DPCM) compressor including means for predicting the value of said digital information, means for forming the differences between said digital information and said prediction, and a quantizer for quantizing said difference, and wherein said configurations comprise families of quantizers.

4. The transmitter claimed in claim 3, wherein said control signal S is a scaling factor employed to multiply said differences prior to quantization.

5. A method for transmitting digital information through a channel at a fixed transmission rate, comprising the steps of:
   a) compressing said digital information, employing a plurality of compression configurations, each configuration being characterized by a unique rate distortion function and being responsive to a control signal S for controlling the operating point on the rate distortion function;
   b) temporarily storing compressed digital information received from said compressor means in a rate buffer; and
   c) switching between said configurations as a function of both the fill rate of the rate buffer and the control signal S so that the average output rate of said compression is equal to said fixed transmission rate and distortion is minimized.

* * * * *